Feb. 20, 1962   R. YANIUK   3,021,662
STRIPPER ASSEMBLY FOR COMBINES
Filed Oct. 19, 1959

INVENTOR: RAYMOND YANIUK.
BY

HIS ATTORNEYS

United States Patent Office 3,021,662
Patented Feb. 20, 1962

3,021,662
STRIPPER ASSEMBLY FOR COMBINES
Raymond Yaniuk, Box 175, Teulon, Manitoba, Canada
Filed Oct. 19, 1959, Ser. No. 847,200
1 Claim. (Cl. 56—364)

My invention relates to new and useful improvements in combines, and more specifically to the rotatable table auger tube normally associated therewith.

Conventional combines incorporate a transverse strap which places the grain to be combined upon a moving conveyor which in turn transfers it rearwardly to the table auger tube. This auger tube normally is provided with flights upon each end thereof feeding towards the center and is provided with feed assisting fingers which transfer the grain from the table to the conveyor feeder within the combine.

The principal difficulty encountered in the use of such a combine resides in the fact that long grain stalks and weeds, such as bind weeds and the like, become wrapped around the center portion of the table auger tube which therefore becomes choked and jammed with such stalks. The combine then has to be stopped so that the operator can clear these wrapped around stalks by hand.

I have overcome this principal disadvantage by providing a stripping assembly mounted upon the framework of the combine immediately above the central portion of the auger tube, said stripping assembly being provided with a plurality of knives which are situated just clear of the periphery of the central tube so that any stalks or vines wrapping around the tube are immediately severed into small pieces so that they drop from the tube and are passed rearwardly with the remainder of the grain.

The principal object and essence of my invention is therefore to provide a device of the character herewithin described which prevents the build up of stalks and weed vines upon the central portion of a combine auger tube.

Another object of my invention is to provide a device of the character herewithin described which is readily adaptable to be attached to conventional combine structure.

A yet further object of my invention is to provide a device of the character herewithin described in which the knife blades are readily accessible for sharpening or replacement.

A yet further object of my invention is to provide a device of the character herewithin described which can be situated upon a combine without interfering with the conventional extendable and retractable feed assisting fingers normally found upon the central portion of the auger tube.

Still another object of my invention is to provide a device of the character herewithin described which is simple in construction, easily attachable to a combine, and which enables the operator to combine a field without continually stopping to clear stalks and vines from the table auger tube.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
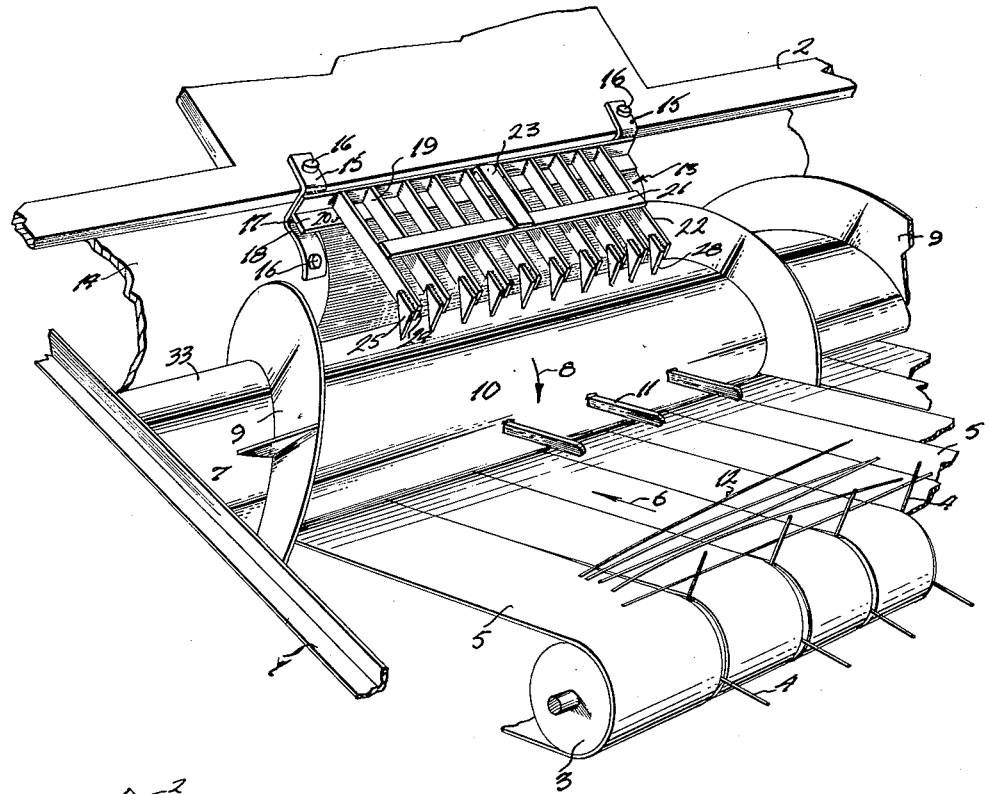
FIGURE 1 is a fragmentary perspective view of the front portion of a combine showing the pick-up fingers, the conveyor table, a portion of the rotatable table auger tube, and having my invention situated thereon.

Proceeding now to describe my invention in detail, reference should be made to the accompanying drawings in which I have illustrated fragmentarily, the front portion of a combine including supporting structure 1 and 2.

A conventional pick-up drum 3, is provided with pick-up fingers 4 and also carries a plurality of conveyor belts 5 adapted to move in the direction of arrow 6, the aforementioned fingers 4 extending radially outwardly from the drum between adjacent belts 5.

Situated rearwardly of the drum 3 is a conventional table auger tube 7 adapted to rotate in the direction of arrow 8 and carrying feed in auger flights 9 upon each end thereof thus leaving a central portion 10 therebetween. It should be understood that both the tube 7 and the drum 3 are operated from the source of power of the combine (not illustrated) in the conventional manner.

Extending radially from the central portion 10 of the table auger tube 9 is a plurality of feed assisting fingers 11 adapted to pass between adjacent belts 5 and being extendable and retractable as the tube 7 rotates, in the conventional manner. This assists in transferring the grain illustrated by the reference character 12, under the tube 7 and into the internal conveyor of the combine (not illustrated).

My device collectively designated 13 is situated above the central portion 10 of the tube 7 and is supported upon the supporting structure 2 and a curved apron 14 by means of a pair of angulated brackets 15 secured as by bolts 16 as shown in FIGURE 1. A transverse cross bar 17 of angle iron spans the portions 18 of the brackets and is secured thereto as by welding, said cross bar carrying a plurality of cutter supporting bars 19 which extend downwardly and forwardly from the transverse bar 17. These cutter bars, which are rectangular when viewed in cross section, are secured at their upper ends by their lower edges 20 to the bar 17 as by welding.

A transverse stiffener bar 21 spans the upper edges 22 of the cutter bars 19 and is secured to these bars by welding, a longitudinal strut 23 extending from the center of the bar 21 rearwardly to the cross bar 17 as clearly shown.

Figure 2:
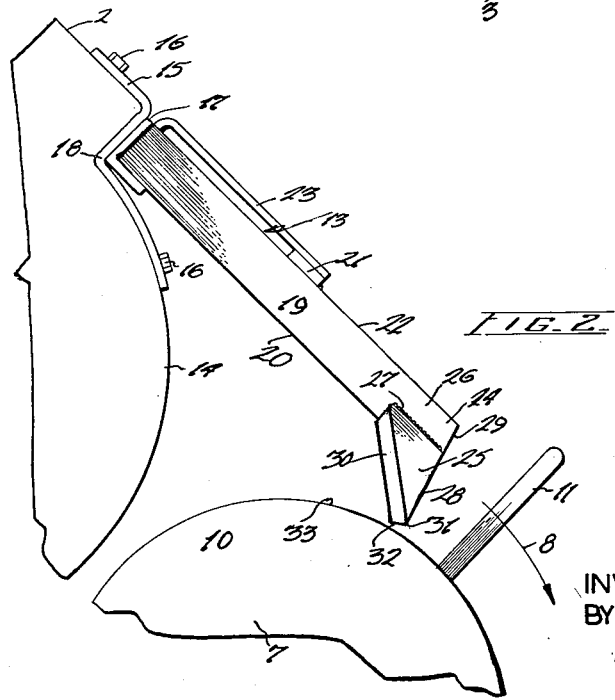
FIGURE 2 is an enlarged fragmentary side elevation of FIGURE 1.

Upon the forward or lower ends 24 of the cutter bars 19, I have provided a plurality of cutter elements 25 which are substantially triangular when viewed in side elevation. These cutter elements 25 are secured to the side faces 26 of the cutter bars by welding 27, so that the front edges 28 of the cutter elements are flush with the front ends 29 of the cutter bars 19. The rear edges 30 of the cutter elements incline upwardly and rearwardly from the lower corners 31 of the cutter elements, and are sharpened as illustrated in FIGURE 2, and it will be observed that the lowermost extremity 32 on the cutter elements is situated so that it is just clear of the periphery 33 of the aforementioned central portion 10 of the table auger tube 9.

The cutter bars 19 are situated in spaced and parallel relationship along the transverse bar 17 and are positioned so that the aforementioned feed assisting fingers 11 pass between adjacent cutter bars.

In operation, the assembly is bolted into position as illustrated and of course does not interfere with the normal transferring of grain 12 from the table 5 to underneath the auger tube 10.

However, if relatively long stalks or vine weeds or the like, become wound around the central portion 10 of tube 9, they are severed by the cutter elements 30 before they can build up to a point where they interfere with the operation of the device and these cut portions fall back onto the table 5 to be carried underneath the tube 9 together with the grain passing thereunder.

It is therefore appreciated that the central portion of the drum 10 is kept relatively free of the vines and the like which can readily choke the intake of the machine if not cleared as soon as they become wound around the central portion of the drum.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

A device for cutting and stripping long grain stalks and weeds from the auger drum of a combine, said device comprising a horizontally elongated support bar of an L-shaped cross-section including a lower flange and a second flange perpendicular thereto, a pair of mounting brackets provided at the ends of said support bar for attaching the same to a combine, a plurality of spaced parallel straps having opposite side faces, upper and lower edges and inner and outer ends, the inner ends of said straps being secured at longitudinally spaced points to said second flange of said bar with the lower flange of the bar supportably underlying lower edge portions of the straps adjacent their inner ends, said straps extending outwardly at right angles from said support bar a reinforcing bar extending transversely of and secured to the upper edges of intermediate portions of said straps in parallel relation to said support bar, the outer end portions of said straps being free, and a plurality of substantially triangular cutting blades secured to the outer end portions of the respective straps at like side faces thereof and projecting downwardly below the lower edges of the straps, said cutting blades having sharp cutting edges disposed in planes parallel to the respective straps and extending obliquely at obtuse angles from the lower edges of the straps.

References Cited in the file of this patent

UNITED STATES PATENTS

| | | |
|---|---|---|
| 917,849 | Couch | Apr. 13, 1909 |
| 2,778,483 | Nikkel | Jan. 22, 1957 |
| 2,821,061 | Pilcher et al. | Jan. 28, 1958 |
| 2,895,590 | Snow | July 21, 1959 |